(12) United States Patent
Kopanski

(10) Patent No.: US 12,504,043 B2
(45) Date of Patent: Dec. 23, 2025

(54) STRESS REDUCING FASTENER ASSEMBLY

(71) Applicant: Lockheed Martin Corporation, Bethesda, MD (US)

(72) Inventor: Krzysztof D. Kopanski, Stratford, CT (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 0 days.

(21) Appl. No.: 19/012,504

(22) Filed: Jan. 7, 2025

(65) Prior Publication Data
US 2025/0146532 A1 May 8, 2025

Related U.S. Application Data

(62) Division of application No. 17/238,575, filed on Apr. 23, 2021, now Pat. No. 12,215,743.

(51) Int. Cl.
F16C 17/02 (2006.01)
B64C 27/48 (2006.01)
F16C 35/02 (2006.01)
B64C 11/04 (2006.01)
F16B 5/02 (2006.01)

(52) U.S. Cl.
CPC ............ *F16C 35/02* (2013.01); *B64C 27/48* (2013.01); *F16C 17/02* (2013.01); *B64C 11/04* (2013.01); *F16B 5/0258* (2013.01); *Y10T 403/7064* (2015.01); *Y10T 403/75* (2015.01)

(58) Field of Classification Search
CPC .......... F16B 5/01; F16B 5/0258; F16B 43/02; F16B 5/025; Y10T 403/75; Y10T 403/7064; B64C 11/04; B64C 27/48
USPC ................................................ 411/546, 537
See application file for complete search history.

(56) References Cited

U.S. PATENT DOCUMENTS 2,505,915 A * 5/1950 Salmi ................. F16B 19/1027
411/930
3,270,410 A * 9/1966 Salter ...................... B23P 9/025
29/446
3,603,626 A 9/1971 Whiteside
3,923,422 A 12/1975 Ianniello et al.
(Continued)

OTHER PUBLICATIONS

Final Office Action on U.S. Appl. No. 17/238,575 dated Jul. 11, 2024 (11 pages).
(Continued)

Primary Examiner — Nathaniel E Wiehe
Assistant Examiner — Art Golik
(74) Attorney, Agent, or Firm — Foley & Lardner LLP

(57) ABSTRACT

A method of coupling a first structure to a second structure includes providing a first bushing within an opening in an upper surface of the first structure, without the first bushing extending into a second opening in the second structure. The method further includes providing an inner opening of the first bushing which defines an inner diameter, and providing a fastener at least partially within the first bushing and at least partially within the second opening. An outer surface of the fastener defines an outer diameter. The first bushing and the fastener are configured such that a space between the outer surface of the fastener and the inner opening of the first bushing defines a gap dimensioned to increase in a direction away from the upper surface of the first structure.

13 Claims, 10 Drawing Sheets

(56) References Cited

U.S. PATENT DOCUMENTS

| | | | |
|---|---|---|---|
| 4,339,230 A | 7/1982 | Hill | |
| 4,961,687 A | 10/1990 | Bost et al. | |
| 4,974,989 A * | 12/1990 | Salter | F16B 5/02 |
| | | | 403/312 |
| 8,458,885 B2 | 6/2013 | Bianco et al. | |
| 9,933,003 B2 * | 4/2018 | Wu | F16B 13/06 |
| 9,982,700 B2 * | 5/2018 | Najima | F16B 19/1081 |
| 2002/0094253 A1 * | 7/2002 | Enomoto | F16B 19/1081 |
| | | | 411/41 |
| 2005/0123372 A1 * | 6/2005 | Sato | F16B 5/0258 |
| | | | 411/32 |
| 2018/0312249 A1 | 11/2018 | Schmaling et al. | |

OTHER PUBLICATIONS

Non-Final Office Action on U.S. Appl. No. 17/238,575 dated Jan. 29, 2024 (12 pages).

Notice of Allowance on U.S. Appl. No. 17/238,575 dated Sep. 25, 2024 (10 pages).

\* cited by examiner

STRESS REDUCING FASTENER ASSEMBLY

CROSS-REFERENCE TO RELATED APPLICATIONS

This application is a divisional of U.S. patent application Ser. No. 17/238,575, filed on Apr. 23, 2021, the content of which is incorporated herein by reference in its entirety.

STATEMENT REGARDING FEDERALLY SPONSORED RESEARCH OR DEVELOPMENT

This invention was made with government support under Contract No. W911W6-19-9-0005 awarded by the U.S. Army. The government has certain rights in the invention.

FIELD

The present disclosure relates generally to systems and methods of coupling a first structure to a second structure. More specifically, the present disclosure relates to a system and method of reducing local stress concentration experienced by a components in a fastener assembly used to couple a first structure to a second structure.

BACKGROUND

Fasteners (e.g., lugs, bolts, screws, pins, etc.) may experience stress concentrations when coupling a first structure to a second structure. Further, the first structure and the second structure may experience stress concentrations proximate the fastener. For example, the load experienced by the fastener may cause the fastener to bend, thereby causing local stress concentration in the fastener, the first structure, and/or the second structure. This may result in decreased performance of the fastener, the first structure, and/or the second structure. Further, the local stress concentrations may cause damage to the first structure or the second structure that the fastener is coupled to.

SUMMARY

At least one embodiment relates to a system to fasten a first structure and a second structure, the system including a bushing positioned within an opening in the upper surface of the first structure, wherein an inner opening of the bushing defines an inner diameter, and a fastener is at least partially positioned within the bushing, wherein an outer surface of the fastener defines an outer diameter, wherein the bushing and the fastener are configured such that a space between the outer surface of the fastener and the inner opening of the bushing defines a gap, wherein the gap increases in size in a direction extending from the upper surface to the lower surface of the first structure.

According to various embodiments, the inner diameter of the bushing increases in size in a direction extending from the upper surface to the lower surface of the first structure. According to various embodiments, the outer diameter of the fastener decreases in size in a direction extending from the upper surface the lower surface of the first structure. According to various embodiments, the outer surface of the fastener and the inner opening of the bushing define a taper angle in a direction extending from the upper surface to the lower surface of the first structure, wherein the taper angle is between about zero degrees and about ten degrees. According to various embodiments, the taper angle is about 0.8 degrees. In some embodiments, the taper angle is between about 0.1 and about 1 degrees, between about 0.1 and about 0.5 degrees, between about 0.5 and about 1 degrees, between about 1 and about 1.5 degrees, or between about 1 and about 2 degrees. According to various embodiments, the bushing is a first bushing and the fastener assembly further includes a second bushing positioned within the opening in the upper surface of the first structure, and a retainer surrounding at least a portion of the first bushing and the second bushing. According to various embodiments, the first structure comprises composite material. According to various embodiments, the fastener comprises metallic material. According to various embodiments, the first structure is a rotor blade, and the fastener assembly is configured to couple the first structure to the second structure, the second structure being a rotor head.

Another embodiment relates to a fastener assembly configured to couple a rotor blade to a rotor head including a bushing positioned within an opening in the rotor blade, wherein an inner opening of the bushing defines an inner diameter, and a fastener is at least partially positioned within the bushing and at least partially positioned within the rotor head, wherein an outer surface of the fastener defines an outer diameter, wherein the bushing and the fastener are configured such that a space between the outer surface of the fastener and the inner opening of the bushing defines a gap, wherein the gap increases in size in a direction away from an upper surface of the rotor blade.

According to various embodiments, the inner diameter of the bushing increases in size in a direction away from the upper surface of the first structure. According to various embodiments, the outer diameter of the fastener decreases in size in a direction away from the upper surface. According to various embodiments, the outer surface of the fastener and the inner opening of the bushing define a taper angle that is about 0.8 degrees.

Another embodiment relates a method of coupling a first structure to a second structure, including providing a bushing within an opening in an upper surface of the first structure, wherein an inner opening of the bushing defines an inner diameter, and providing a fastener at least partially within the bushing, wherein an outer surface of the fastener defines an outer diameter, wherein the bushing and the fastener are configured such that a space between the outer surface of the fastener and the inner opening of the bushing defines a gap, wherein the gap increases in size in a direction away from the upper surface of the first structure.

According to various embodiments, the inner diameter of the bushing increases in size in a direction away from the upper surface of the first structure. According to various embodiments, the outer diameter of the fastener decreases in size in a direction away from the upper surface. According to various embodiments, the outer surface of the fastener and the inner opening of the bushing define a taper angle, wherein the taper angle is approximately 0.8 degrees. According to various embodiments, the bushing is a first bushing and the method further includes providing a second bushing within the opening in the upper surface of the first structure, and providing a retainer surrounding a portion of the first bushing and the second bushing. According to various embodiments, the first structure comprises composite material. According to various embodiments, the fastener comprises composite material.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
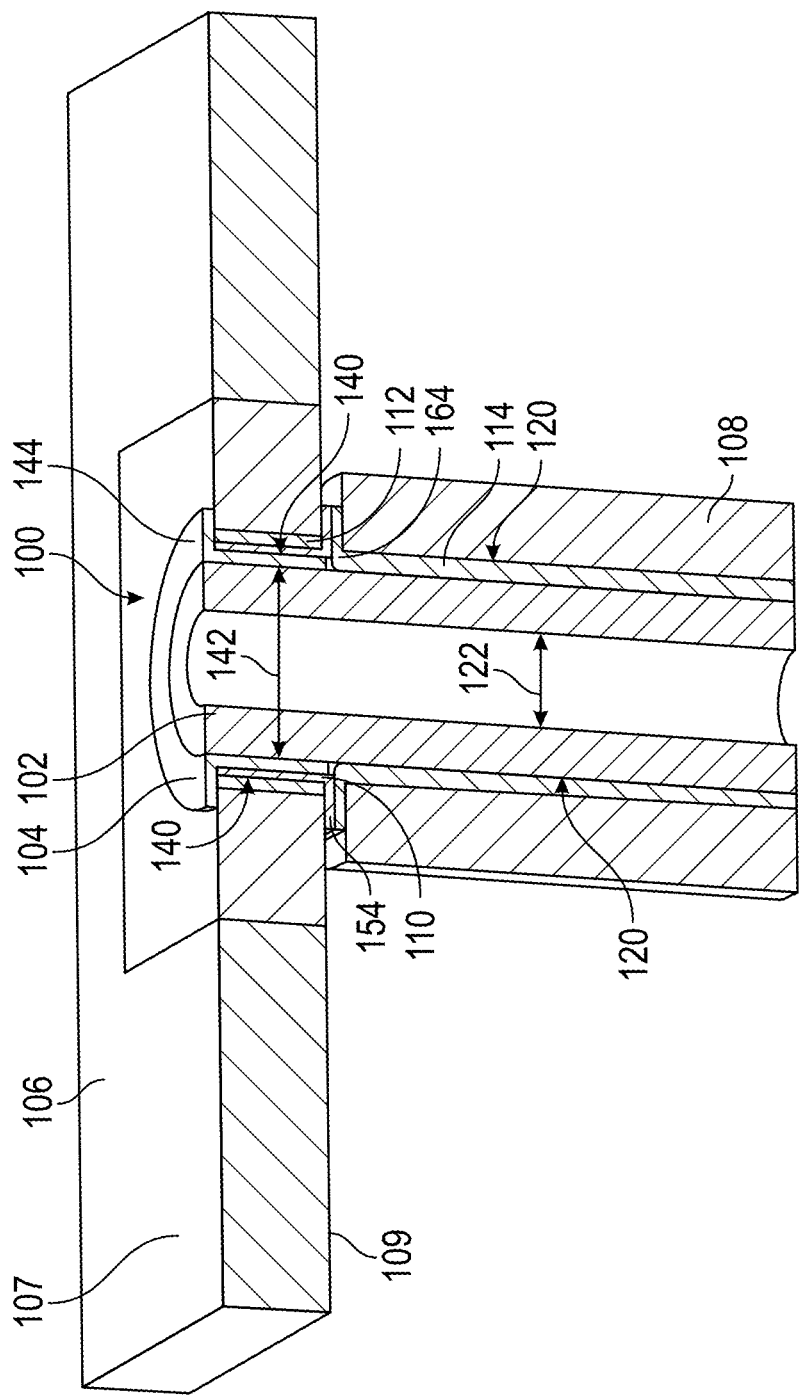
FIG. 1 is a cross sectional view of a fastener assembly, according to an example embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Fastener assemblies include fasteners (e.g., lugs, bolts, screws, pins, etc.) that can be used to couple a first structure to a second structure. According to various embodiments, the fasteners, the first structure, the second structure, and other components of the fastener assembly, may experience loads while coupling the structures as a result of forces acting on the first structure, the second structure, and/or the fastener. For example, a fastener may be used to couple a rotor head to a blade (e.g., as a part of a helicopter, wind turbine, fixed wing aircraft propellers, etc.). In this example, the fastener may be in a loaded state as a result of various forces (e.g., the weight of the spar, the weight of the blade, centripetal force resulting from rotation of the blade, etc.). The loads experienced by fastener may cause the fastener to deflect (e.g., bend), which may result in undesired local stress concentrations in the fastener. Further, the bending of the fastener may result in local stress concentrations in the first structure and the second structure, which may be particularly undesirable if the first structure and/or the second structure is manufactured from a composite material. According to various embodiments, a fastener may be positioned within an inner opening of a bushing, which may be positioned within an opening of a structure.

In a loaded state, the fastener may bend such that only a relatively small portion of the outer surface of the fastener contacts the inner opening of the bushing, compared to the when the fastener assembly in an unloaded state. In this example, the fastener may have a localized stress concentration proximate the portion of the fastener that is contacting the bushing under the loaded condition, which may result in degraded performance of the fastener assembly. Further, the first structure and the second structure may experience localized stress concentration(s) proximate one or more portions of the fastener contacting the bushing under the loaded condition, which may result in degraded performance of the first structure and/or the second structure. Thus, according to various embodiments described herein, a fastener assembly that reduces localized stress concentrations is disclosed.

According to various embodiments, fastener assemblies may include various components manufactured from composite materials (e.g., carbon fiber, poly-paraphenylene terephthalamide (K29) (e.g. Kevlar®), fiberglass, etc.). Advantageously, composite structures may have a relatively high strength to weight ratio when compared to other materials (e.g., metal). However, composite structures may be weak in certain directions and susceptible to partial or complete failure under certain directional loads. For example, composite materials, especially large structures manufactured from composite materials, may be more susceptible to shear (e.g., interlaminar shear) or fracture under heavy loads than metal components, especially if the composite structure experiences local stress concentrations. Thus, when a fastener assembly includes composite components, reducing local stress concentrations may reduce the risk of shear or fracture.

Referring generally to the figures, systems and methods of reducing the stress concentration experienced by the components in a fastener assembly, including a first structure, a second structure, and a fastener used to couple the first structure to the second structure are disclosed herein. According to various embodiments, the fastener assembly includes a fastener that is received within an inner opening of a bushing. According to various embodiments, the inner opening of the bushing is tapered such that a gap exists between the fastener and the bushing when the fastener assembly in an unloaded state. The inner opening of the bushing may be tapered to have a taper angle, which can be tailored based on expected loads that the fastener may experience. In this example, the size of the gap between the fastener and the bushing may not be constant throughout the fastener assembly. For example, the size of the gap may be smallest near the top of the fastener assembly and the gap may increase in size up until a specific depth. By tailoring the draft angle based on expected loads, when the fastener bends in a loaded state, a larger portion of the fastener contacts the bushing than if there was no draft angle, thereby by reducing the localized stress concentration of the first structure, the second structure, and the fastener. According to various embodiments, the fastener may be tapered instead of, or in addition to, the bushing being tapered to further reduce local stress concentrations in the fastener assembly.

Figure 2:
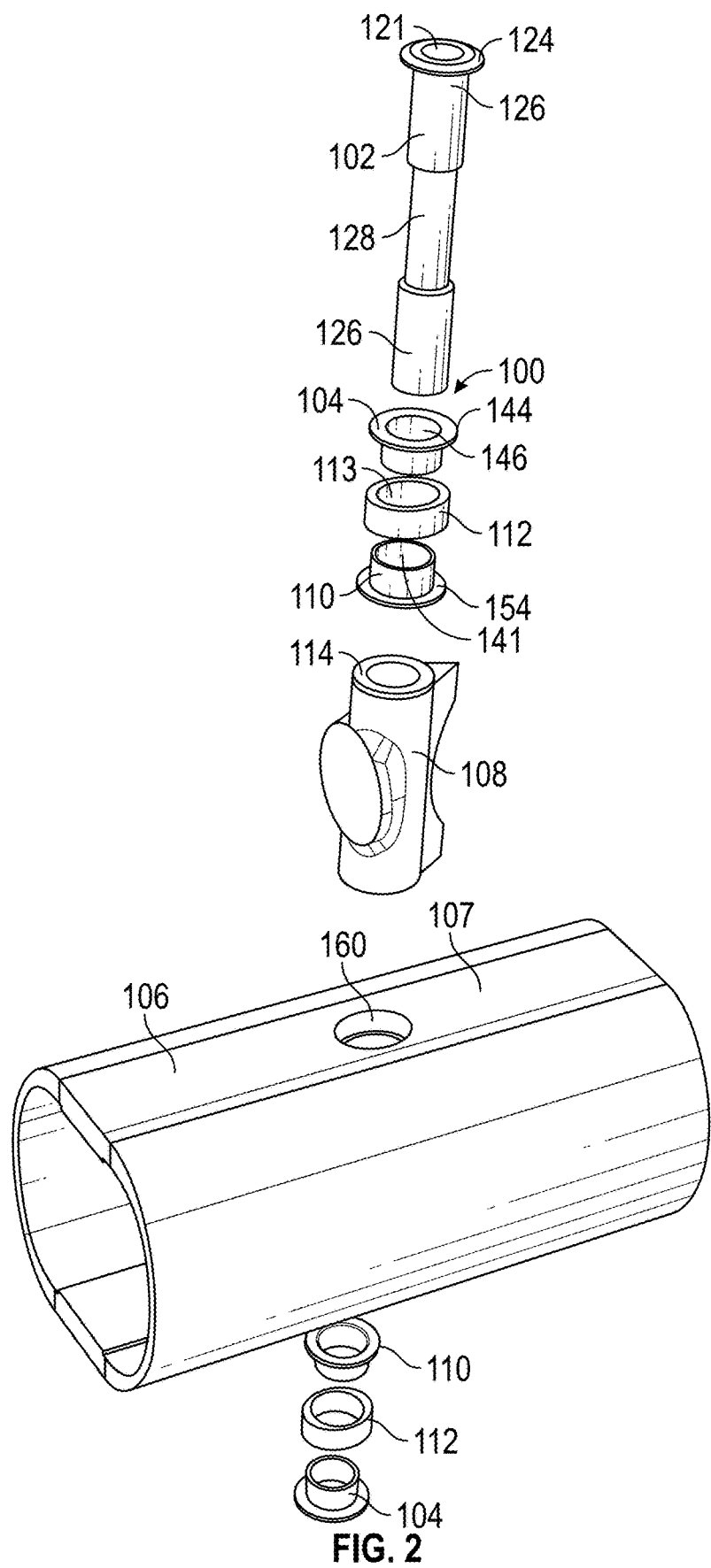
FIG. 2 is an exploded view of the fastener assembly of FIG. 1, according to an example embodiment.

Referring now to FIGS. 1 and 2, a cross sectional view and an exploded view, respectively, of a fastener assembly 100 are shown, according to an example embodiment. The fastener assembly 100 may be used to couple a first structure 106 to a second structure 108. According to various embodiments, the first structure 106 and the second structure 108 are a part of a blade assembly (e.g., as a part of a helicopter, wind turbine, fixed wing aircraft propellers, etc.). For example, the first structure 106 may be a part of the blade (e.g., the blade spar 700 shown in FIG. 10) and the second structure 108 may be a part of the rotor head (e.g., the arm 502 shown in FIG. 8). In this example embodiment, the fastener assembly 100 is used to couple the rotor head to the blade such that energy may be transferred between the rotor head and the blade through the fastener assembly 100.

The fastener assembly 100 includes a fastener 102 (e.g., lug, bolt, screw, pin, etc.) used to couple the first structure 106 to the second structure 108. As shown in FIG. 1, when assembled, a first portion 126 (see FIG. 2) of the fastener 102 is positioned within an opening 160 (see FIG. 2) in the first structure 106 and a second portion 128 (see FIG. 2) of the fastener 102 is positioned within the second structure 108. As shown, the opening 160 is generally elliptical, however, in other embodiments, the opening 160 may be circular or have another shape. As will be discussed further herein, the fastener 102 may be subjected to various forces while coupling the first structure 106 to the second structure 108.

For example, when the fastener assembly 100 is used in a blade assembly, rotation of the blades, including the first structure 106 and the second structure 108, may result in a load being applied to the fastener 102 as a result of the centripetal forces resulting from the rotation of the blades, as will be discussed further below with respect to FIG. 4. The fastener 102 includes a flange 124 (see FIG. 2). The bottom surface of the flange 124 is flush with an upper surface 107 of the first structure 106 when installed into the first structure 106. The outer surface of the fastener 102 defines an outer diameter 120 of the fastener 102. It should be appreciated that the outer diameter 120 may be constant throughout the fastener 102 or the outer diameter 120 may vary though ought the fastener 102. For example, as shown in FIG. 2, the outer diameter 120 is larger in the first portion 126 of the fastener 102 than the second portion 128 of the fastener 102. As shown, the fastener 102 includes an inner opening 121 such that the fastener 102 is at least partially hollow, such that an inner opening 121 of the fastener 102 defines an inner diameter 122.

According to various embodiments, a hollow fastener 102 may be advantageous due to the fastener 102 being relatively light compared to a solid fastener. According to various embodiments, the fastener may be relatively large. For example, the outer diameter 120 of the fastener 102 may be between about one and about six inches. According to an example embodiment, the outer diameter 120 of the fastener 102 is about 1.5 inches. According to various embodiments, the fastener 102 may be partially or completely manufactured from metal (e.g., aluminum, steel, titanium, etc.). In various embodiments, the fastener 102 may be partially or completely manufactured from composite material (e.g., carbon fiber, poly-paraphenylene terephthalamide (K29) (e.g. Kevlar®) made by DuPont de Nemours, Inc. of Wilmington, DE), fiberglass, etc.).

The fastener assembly 100 further includes a first bushing 104 (e.g., an inner bushing) that is configured to receive a portion of the fastener 102. For example, as shown in FIG. 1, the first bushing 104 may be received by the opening 160 in the first structure 106 such that a portion of the first bushing 104 is positioned between the first structure 106 and the fastener 102. As shown, the first bushing 104 is a flanged bushing, which includes a flange 144, however, according to various embodiments, other types of bushings may be used. As shown, when the first bushing 104 is installed into the first structure 106, the bottom surface of the flange 144 is flush with the upper surface 107 of the first structure 106, thereby preventing the first bushing 104 from sliding into the first structure 106.

As is discussed further below, the first bushing 104 may facilitate distributing the force of the fastener 102 on the first structure 106 to mitigate local stress concentrations in both the fastener 102 and the first structure 106. As shown in FIG. 1, the outer surface of the first bushing 104 defines an outer diameter 140. According to various embodiments, the outer diameter 140 may remain constant through some or all of the first bushing 104. As shown, the first bushing 104 has an inner opening 146 (see FIG. 2) that defines an inner diameter 142. According to various embodiments, the inner diameter 142 varies throughout the first bushing 104. For example, as shown and discussed further below with respect to FIG. 3, the inner diameter 142 is smallest proximate the flange 144 and increases in size in a direction away from the flange 144. According to various embodiments, the first bushing 104 may be partially or completely manufactured from metal (e.g., aluminum, steel, titanium, etc.). In various embodiments, the first bushing 104 may be partially or completely manufactured from composite material (e.g., carbon fiber, poly-paraphenylene terephthalamide (K29) (e.g. Kevlar®), fiberglass, etc.).

The fastener assembly 100 further includes a second bushing 110 (e.g., an outer bushing) that is configured to receive a portion of the first bushing 104. For example, the second bushing 110 includes an opening 141 (see FIG. 2) that is configured to receive the outer surface of the first bushing 104. As shown, a portion of the first bushing 104 is positioned within a portion of the second bushing 110. As shown, the second bushing 110 includes a flange 154. As shown, when the second bushing 110 is installed into the first structure 106, the upper surface of the flange 154 is flush with a lower surface 109 of the first structure 106, thereby preventing the second bushing 110 from sliding into the first structure 106. According to various embodiments, the second bushing 110 may be partially or completely manufactured from metal (e.g., aluminum, steel, titanium, etc.). In various embodiments, the second bushing 110 may be partially or completely manufactured from composite material (e.g., carbon fiber, poly-paraphenylene terephthalamide (K29) (e.g. Kevlar®), fiberglass, etc.).

The fastener assembly 100 further includes a retention ring (e.g., a bushing, a retainer, etc.) 112 that is configured to receive a portion of the first bushing 104 and a portion of the second bushing 110. As shown, the retention ring 112 includes an inner opening 113 (see FIG. 2) configured to surround the outer surface of the second bushing 110, such that a portion of the first bushing 104 and the second bushing 110 are simultaneously positioned within the retention ring 112 when the fastener assembly 100 is installed. The retention ring 112 is sized to fit within an opening of the first structure 106. For example, the retention ring 112 may be pressure fit into the opening of the first structure 106, thereby securing the first bushing 104 and the second bushing 110 within the opening in the first structure.

As shown, the outer diameter of the retention ring 112 is generally elliptical such that the retention ring 112 fits within the elliptical opening 160, however, in other embodiments, the retention ring 112 may be circular. Further, the inner opening 113 is generally circular. According to various embodiments, the retention ring 112 may be partially or completely manufactured from metal (e.g., aluminum, steel, titanium, etc.). In various embodiments, the retention ring 112 may be partially or completely manufactured from composite material (e.g., carbon fiber, poly-paraphenylene terephthalamide (K29) (e.g. Kevlar®), fiberglass, etc.). It should be appreciated that the retention ring 112 may be omitted according to various embodiments.

The fastener assembly 100 further includes a third bushing 114 positioned within an opening of the second structure 108 and configured to receive a portion of the fastener 102.

As shown, the third bushing 114 includes a flange 164. As shown, when the third bushing 114 is installed into the second structure 108, the lower surface of the flange 164 is flush with the upper surface of the second structure 108, thereby preventing the third bushing 114 from sliding into the second structure 108. According to various embodiments, the third bushing 114 may be partially or completely manufactured from metal (e.g., aluminum, steel, titanium, etc.). In various embodiments, the third bushing 114 may be partially or completely manufactured from composite material (e.g., carbon fiber, poly-paraphenylene terephthalamide (K29) (e.g. Kevlar®), fiberglass, etc.).

Figure 3A:
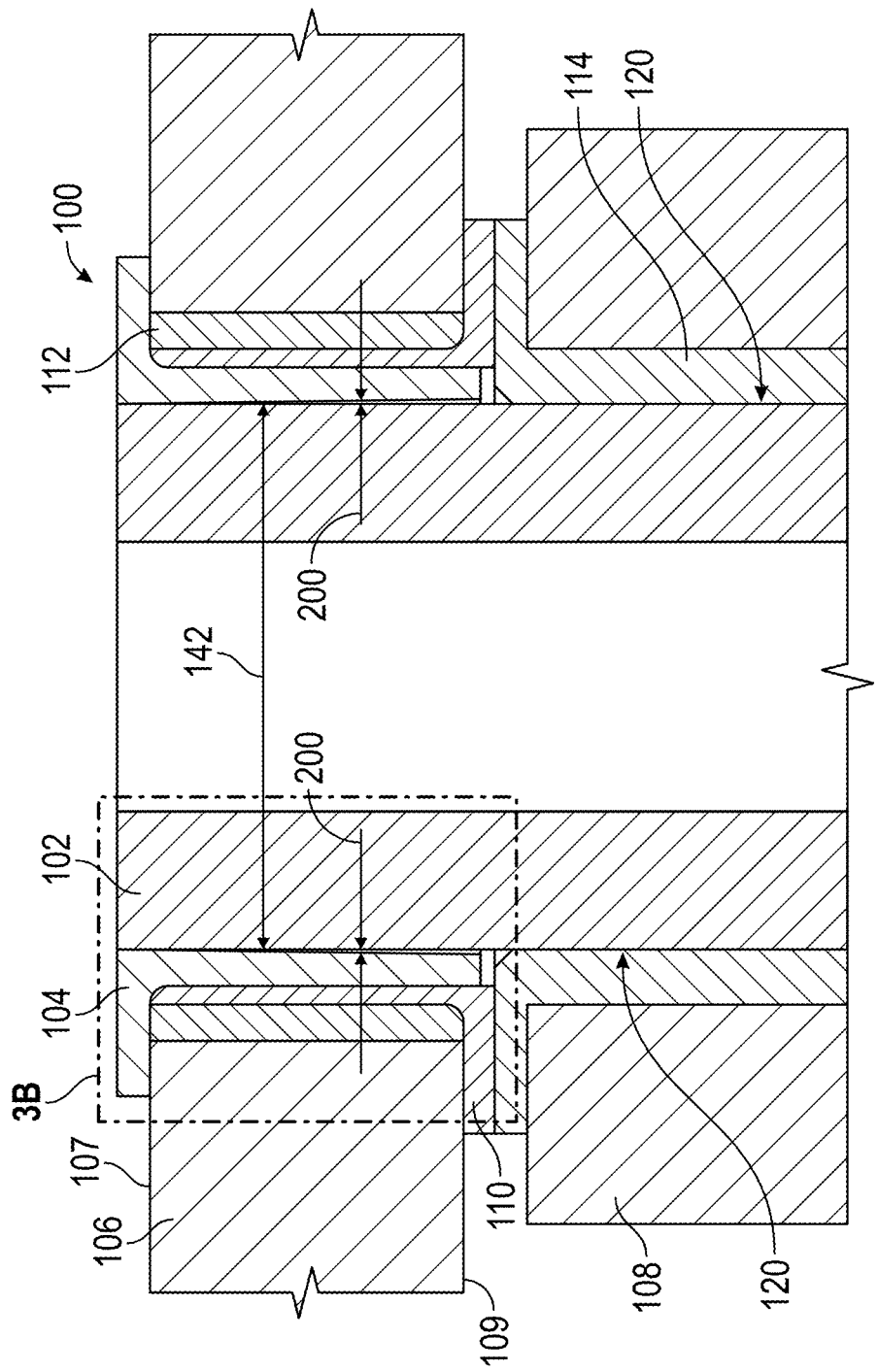
FIG. 3A is a cross sectional view of the fastener assembly of FIG. 1 in an unloaded state, according to an example embodiment.
Figure 3B:
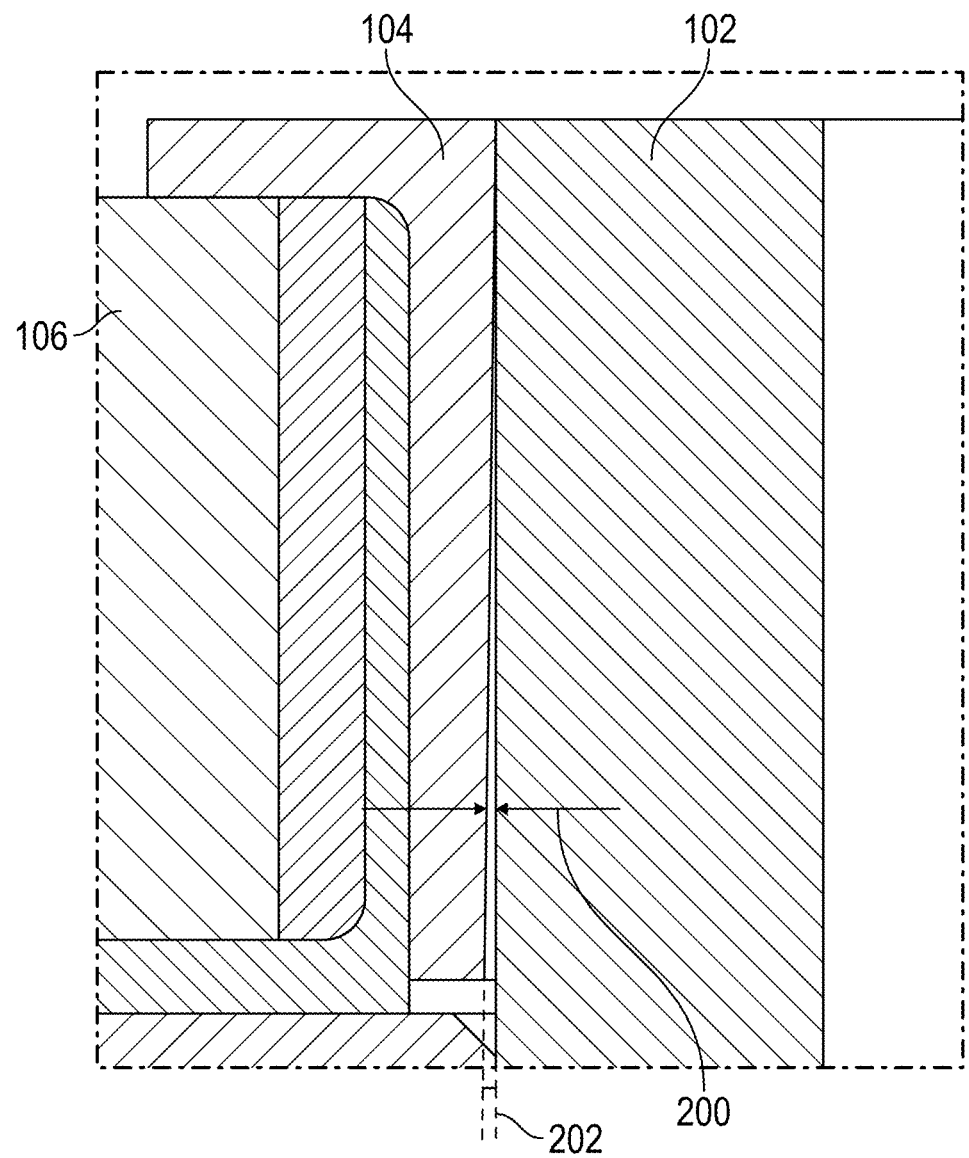
FIG. 3B is a partial cross sectional view of the fastener assembly of FIG. 1 in an unloaded state, according to an example embodiment.

Referring now to FIGS. 3A and 3B, a cross sectional view and a partial cross sectional view, respectively, of the fastener assembly 100 is shown in an unloaded state, according to an example embodiment. The unloaded state is a state in which the fastener 102 experiences relatively low forces as compared to the loaded state. For example, in a blade assembly (e.g., as a part of a helicopter, wind turbine, fixed wing aircraft propellers, etc.), the unloaded state may be when the blades are motionless and the loaded state may be when the blades are spinning. As shown, in the unloaded state, there is a gap 200 between the fastener 102 and the first bushing 104. As shown, the gap 200 is a result of the inner diameter 142 of the first bushing 104 increasing in a direction away from the upper surface 107 of the first structure 106 while the outer diameter 120 of the portion of the fastener 102 positioned within the first bushing 104 remains constant.

However, it should be appreciated that a similar gap 200 may be achieved by providing a fastener 102 with an outer diameter 120 that decreases in size away from the upper surface 107 of the first structure 106. As shown, the gap 200 increases in a direction away from the upper surface 107 of the first structure 106, such that the outer diameter 120 of the fastener 102 and the inner diameter 142 of the first bushing 104 defines a taper angle 202 (see FIG. 3B). As is discussed below, the taper angle 202 may be tailored based on expected conditions in the loaded state to minimize local stress concentrations in the fastener 102 and the first structure 106. For example, the taper angle 202 may be between about zero and about twenty degrees. For example, the taper angle 202 may be between zero and ten degrees. For example, the taper angle may be between zero and three degrees. According to at least one embodiment, the taper angle 202 is about 0.8 degrees. According to various embodiments, the taper angle 202 is 0.1 degrees, 0.2 degrees, 0.3 degrees, 0.4 degrees, 0.5 degrees, 0.6 degrees, 0.7 degrees, 0.9 degrees, 1 degrees, 1.1 degrees, 1.2 degrees 1.3 degrees, 1.4 degrees, 1.5 degrees, 1.6 degrees, 1.7 degrees, 1.8 degrees, 1.9 degrees, or 2 degrees. According to various embodiments, the magnitude of the taper angle 202 may be tailored based on anticipated bend of the fastener 102.

Figure 4:
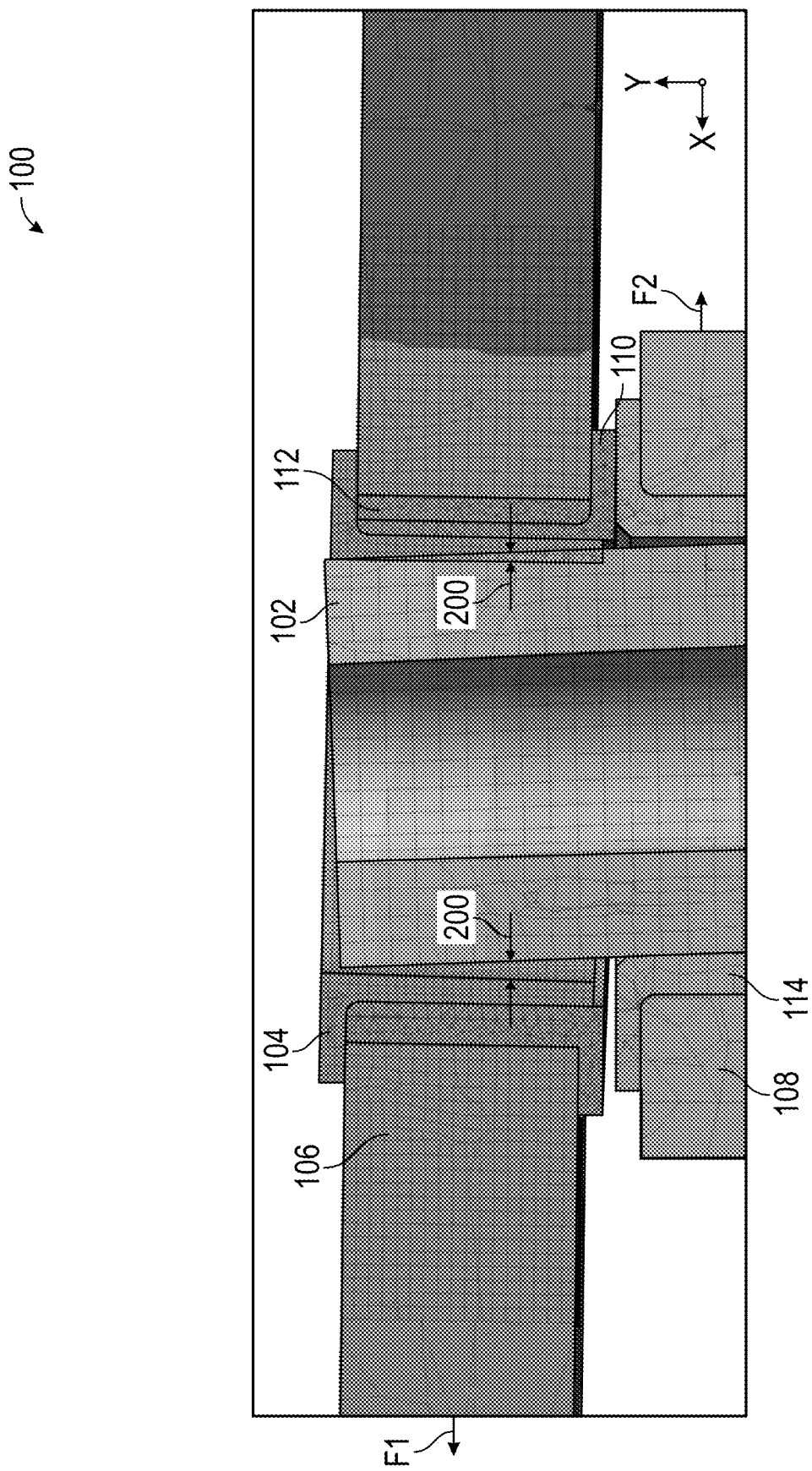
FIG. 4 is a cross sectional view of the fastener assembly of FIG. 1 in a loaded state with exaggerated deformation, according to an example embodiment.

Referring now to FIG. 4, a cross sectional view of the fastener assembly 100 is shown in a loaded state, according to an example embodiment. As shown, in the loaded state, a first force F1 is acting on the first structure 106 and a second force F2 is acting on the second structure 108. For example, in a blade assembly, the first force F1 may be at least partially attributable to the centrifugal force acting upon the first structure 106 (e.g., a blade) and the second force F2 may be equal and opposite of the first force F1. As shown, in the loaded state, the first force F1 and the second force F2 may cause the fastener 102 to bend. In this example embodiment, the fastener 102 bends such that the gap 200 increases in size on a first side of the fastener 102 (e.g., the left side of the fastener 102 as shown in FIG. 4) and decreases in size on the opposite side (e.g., the second side) of the fastener 102 (e.g., the right side of the fastener 102 as shown in FIG. 4). Further, under in the loaded state, the fastener 102 becomes angled within the first bushing 104.

Due to the taper angle 202 (see FIG. 3), the contact area between the fastener 102 and the first bushing 104 is larger than if there was no taper angle 202. For example, if there were no taper angle 202, only a relatively small portion of the bottom of the first bushing 104 would contact the fastener 102. However, the taper angle 202 (see FIG. 3), results in a larger portion of the first bushing 104 being in contact with the fastener 102, thereby resulting in a more uniform pressure distribution on the fastener 102 and the first bushing 104, which decreases local stress concentrations in the fastener 102, the first bushing 104, the second bushing 110, the retention ring 112, and the first structure 106.

According to various embodiments, the taper angle 202 (see FIG. 200) is tailored based on expected loads that the fastener 102 may experience in the loaded condition. For example, in a blade assembly, the taper angle 202 may be tailored based on maximum expected rotor, which would result in a maximum first force F1 and a maximum second force F2 acting on the fastener 102. According to various embodiments, tailoring the taper angle 202 may include modeling the fastener assembly 100 and performing finite element analysis under loaded conditions.

Figure 5:
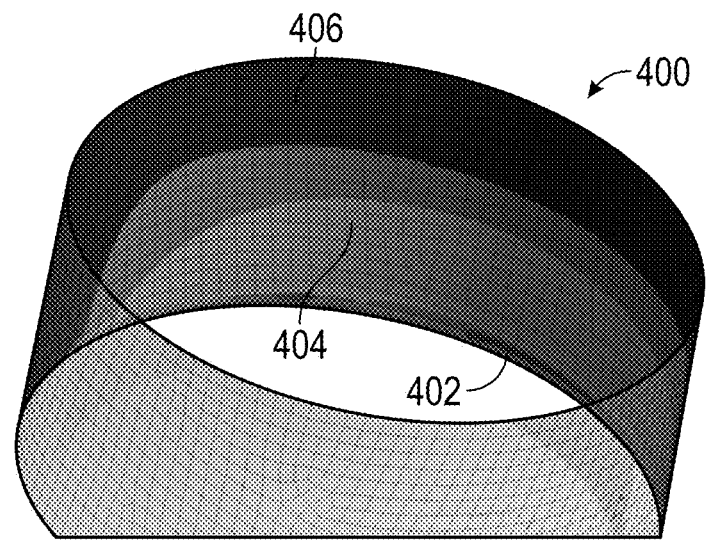
FIG. 5 is a pressure distribution depiction of a structure showing pressure concentrations over a portion thereof.
Figure 6:
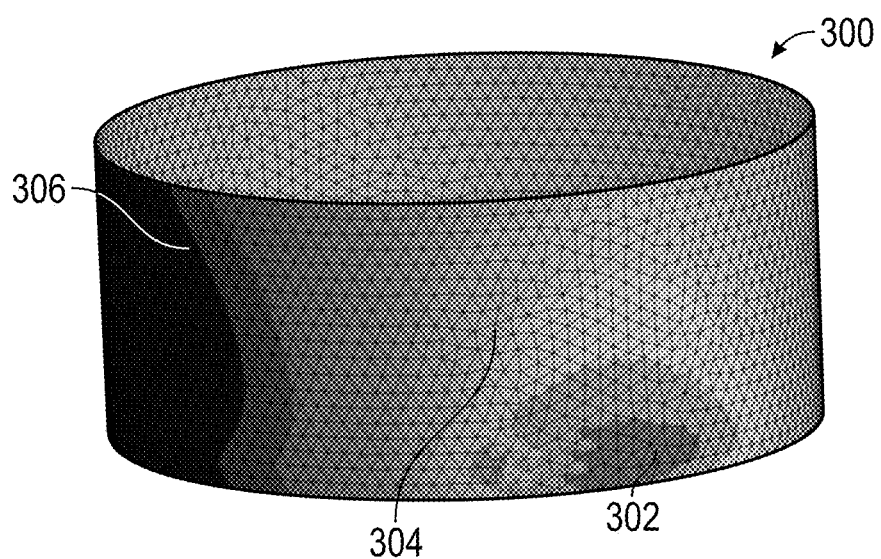
FIG. 6 is a pressure distribution depiction of a structure showing pressure concentrations over a portion thereof.
Figure 7:
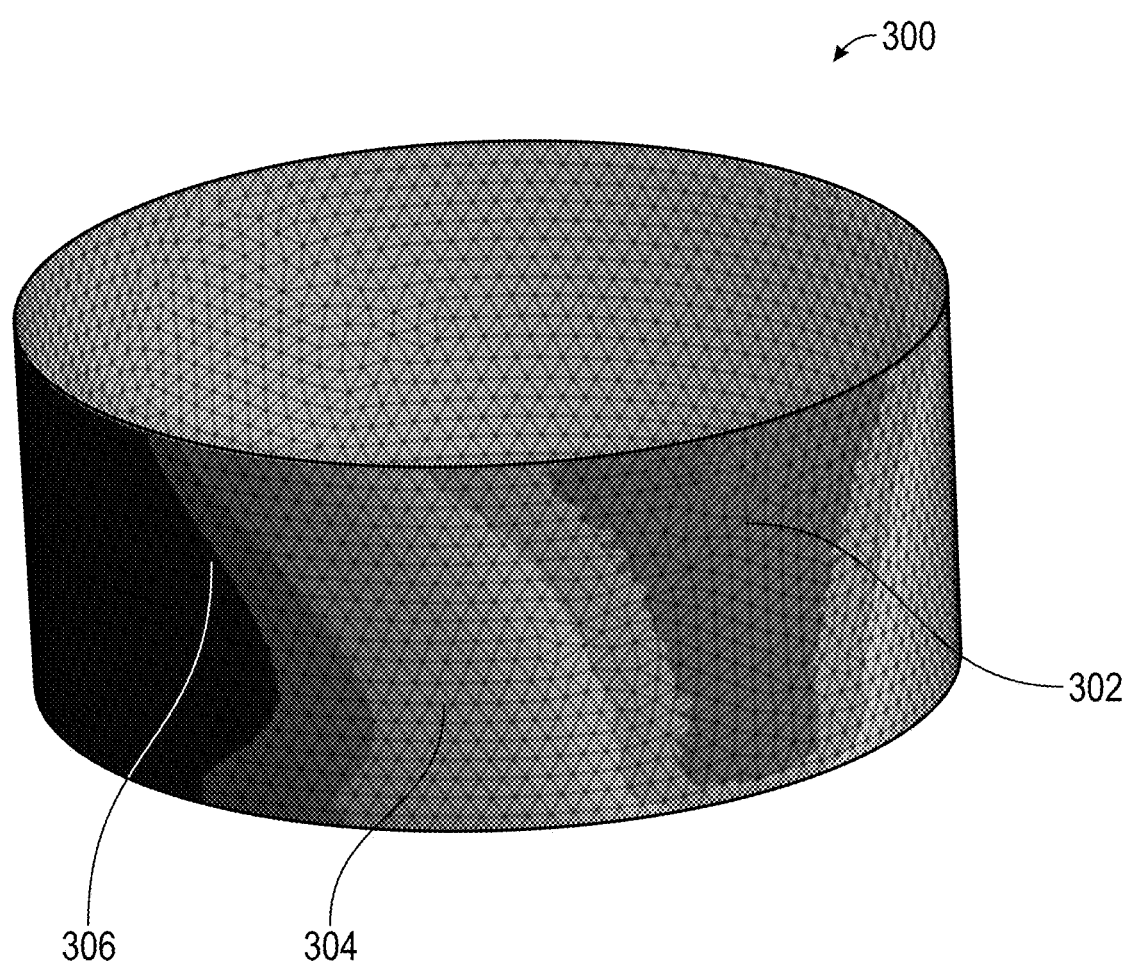
FIG. 7 is a pressure distribution depiction of the structure of FIG. 6 showing pressure concentrations over a portion thereof.

Referring now to FIGS. 5-7, representative pressure distribution depictions of a structure (e.g., the first structure 106) are shown. Each pressure distribution depiction shows the relative pressure zones experienced by the structure under different conditions. In particular, the structure shown in FIG. 5 is a structure 400 that is coupled to another structure via a fastener (e.g., the fastener 102) provided within a non-tapered bushing as discussed below. The structure shown in FIGS. 6-7 is a structure 300 that is coupled to another structure via a fastener provided within a tapered bushing as discussed below. The structures 300, 400 may be coupled to another structure (e.g., the second structure 108) via a fastener (e.g., the fastener 102) as a part of a fastener assembly (e.g., the fastener assembly 100).

The pressure distribution depictions in FIGS. 5-7 show the relative pressure zones (e.g., shown as a pressure gradient) experienced by the structures 300, 400 in the loaded state. As shown, the pressure distribution depiction of the structures 300, 400 includes a maximum pressure zone 302, 402 (e.g., the surface area of the structures 300, 400 that experiences the highest pressure), an intermediate pressure zone 304, 404 (e.g., the surface area of the structures 300, 400 that experiences relatively average pressure), and a minimum pressure zone 306 (e.g., the surface area of the structures 300, 400 that experiences the least pressure).

Referring now to FIG. 5, a pressure distribution depiction of the structure 400 under loaded conditions is shown. In the depiction in FIG. 5, the structure 400 may be coupled to another structure via a fastener. The fastener may be positioned within a bushing that has a uniform inner diameter (i.e., a non-tapered bushing). As shown the structure 400 may experience relatively high local stress concentrations compared to when the structure is coupled to another structure via a fastener located within a tapered bushing (e.g., the structure 300 shown in FIGS. 6 and 7, discussed below). As shown, the maximum pressure zone 402 is relatively concentrated over a relatively small surface area, thereby resulting in local stress concentration. Further, as shown, the minimum pressure zone 406 may experience no pressure, according to various embodiments. The local stress concentrations may be a result of the bending of the fastener within the structure 400 under the loaded condition, which results in reduced surface area contact between the fastener 400 and the bushing.

Referring now to FIG. 6, a pressure distribution depiction of the structure 300 under loaded conditions is shown, according to an example embodiment. In the embodiment shown in FIG. 6, the structure 300 may be coupled to another structure via a fastener. The fastener may be positioned within a tapered bushing (e.g., the first bushing 104). For example, the bushing may have a taper angle (e.g., the taper angle 202) of 0.4 degrees. As shown the structure 300 may experience relatively lower local stress concentrations compared to a when the structure is coupled to another structure via a fastener located within a non-tapered bushing (e.g., the fastener 400 shown in FIG. 5, discussed above). As shown, the maximum pressure zone 302 is distributed over a larger surface area than in FIG. 5, thereby resulting in reduced local stress concentrations. It should be appreciated that the maximum pressure zone 302 in FIG. 6 may experience a lower pressure than the maximum pressure zone 302 in FIG. 5. Further, as shown, the average pressure zone 304 is distributed over a larger surface area of the structure than in FIG. 5.

Referring now to FIG. 7, a pressure distribution depiction of the structure 300 under loaded conditions is shown, according to an example embodiment. In the embodiment shown in FIG. 7, the structure 300 may by coupled to another structure via a fastener. The fastener may be positioned within a tapered bushing (e.g., the first bushing 104). For example, the bushing may have a taper angle (e.g., the taper angle 202) of 0.8 degrees. As shown the structure 300 may experience relatively lower local stress concentrations compared to a structure 300 that is coupled to another structure via a fastener located within a tapered bushing having a smaller taper angle (e.g., the fastener 300 shown in FIGS. 6, discussed above). As shown, the maximum pressure zone 302 is distributed over a larger surface area than in FIG. 6, thereby resulting in local stress concentration. It should be appreciated that the maximum pressure zone 302 in FIG. 7 may experience a lower pressure than the maximum pressure zone 302 in FIG. 6. Further, as shown, the average pressure zone 304 is distributed over a larger surface area of the fastener than in FIG. 5.

Figure 8:
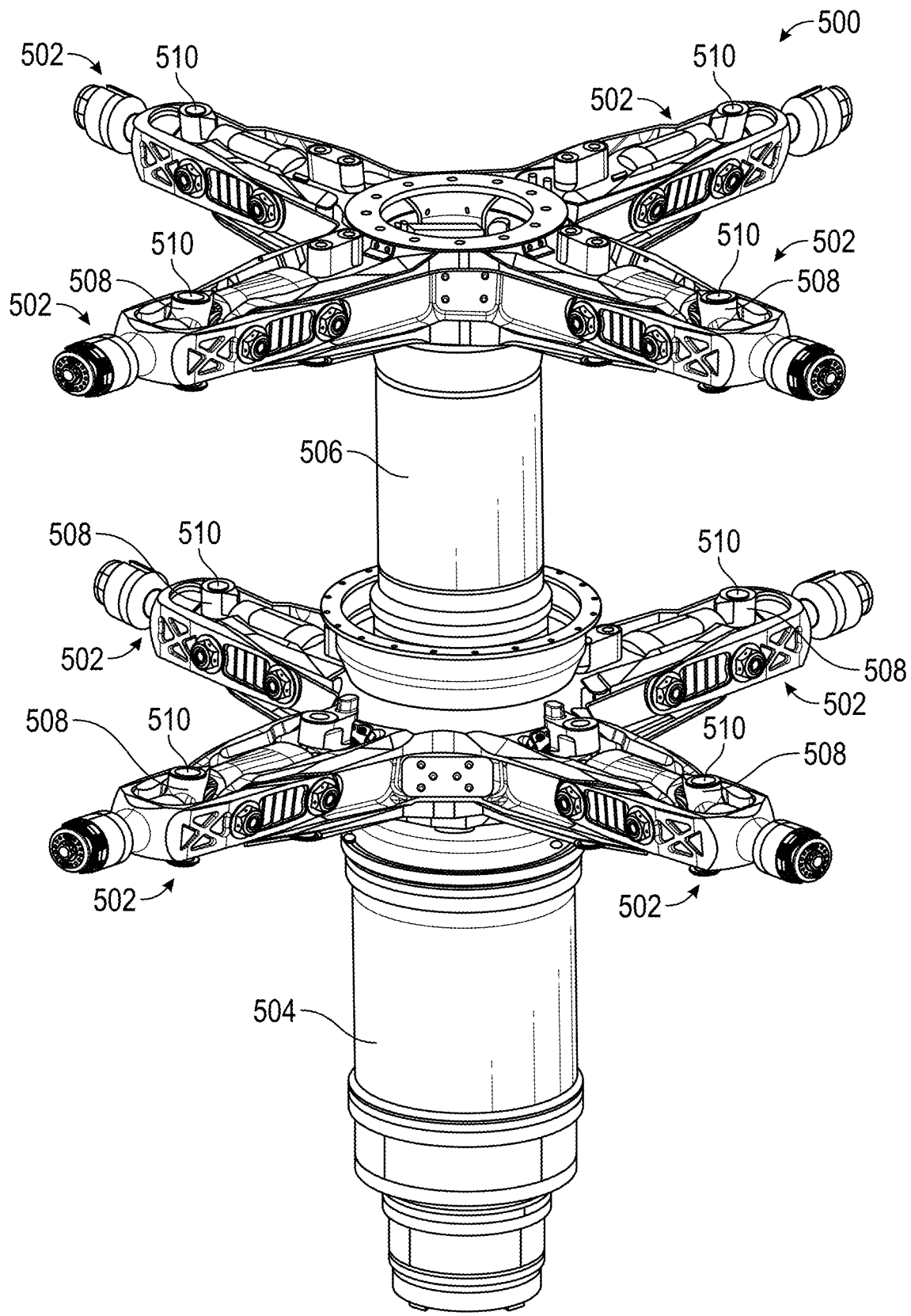
FIG. 8 is a perspective view of a rotor assembly, according to an example embodiment.

Referring now to FIG. 8, a perspective view of a rotor assembly 500 is shown, according to an example embodiment. The rotor assembly 500 may be a part of a helicopter propulsion system (not shown). As shown, the rotor assembly 500 includes a first mast 504 and a second mast 506 that are configured to rotate. According to various embodiments, the first mast 504 and the second mast 506 may rotate in the same direction or in opposite directions (e.g., the first mast 504 spins clockwise and the second mast 506 spins counter clockwise). As shown, a plurality of arms 502 (e.g., hub arm assemblies) are coupled to the first mast 504 and the second mast 506 such that the plurality arms 502 spin as the first mast 504 and the second mast 506 spin. As shown, each arm 502 is coupled to a structure 508. The structure 508 may be the same or similar to the second structure 108 described above. The structure 508 defines an aperture 510. For example, the aperture 510 may be defined by a central opening in a structure 508. The aperture 510 may be configured to receive one or more components of a fastener assembly (e.g., the fastener assembly 100) such that the arm 504 may be coupled to another structure (e.g., the first structure 106 or the blade spar 700 shown in FIG. 10).

Figure 9:
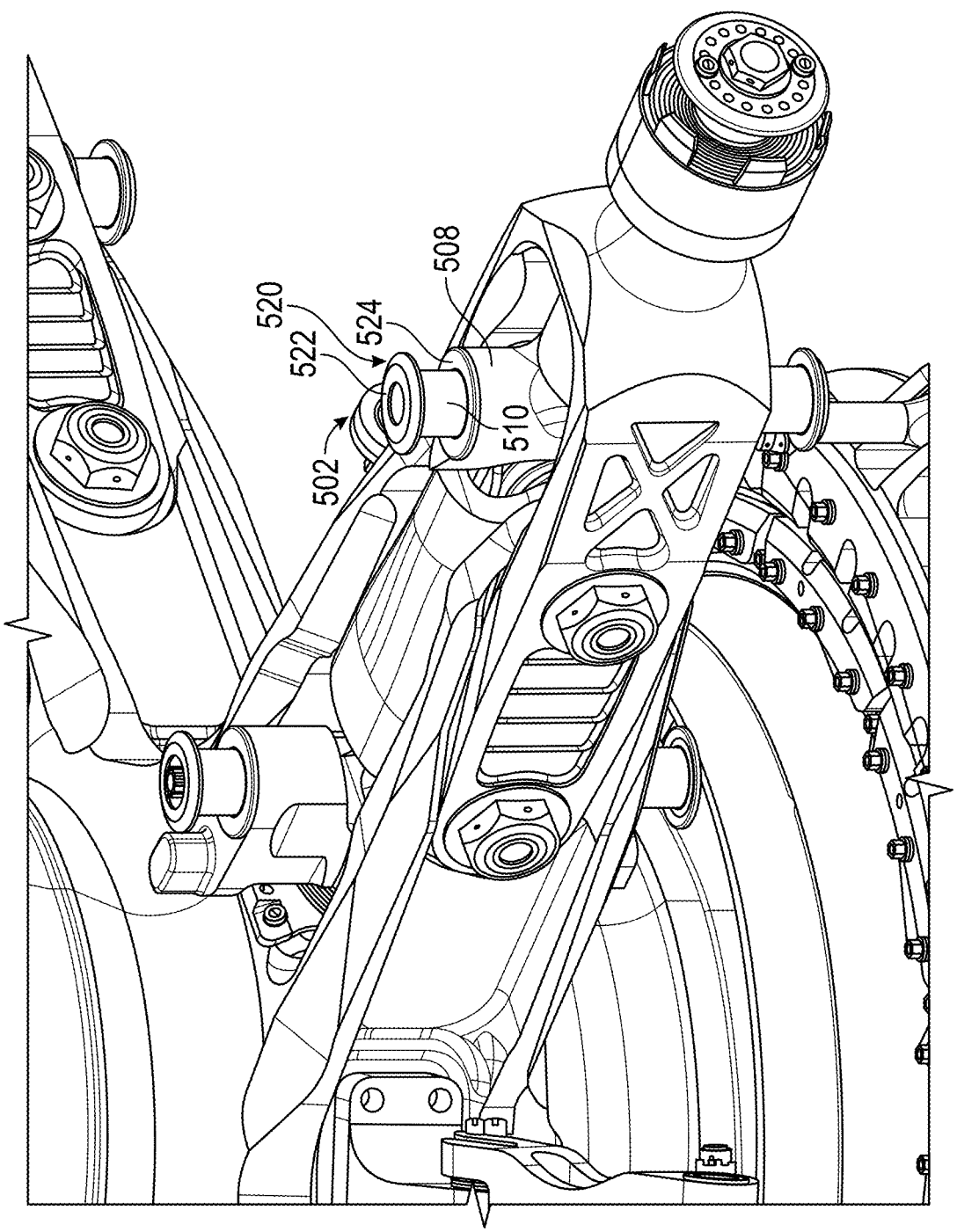
FIG. 9 is a perspective view of a fastener assembly, according to an example embodiment.

Referring now to FIG. 9, a perspective view of a fastener assembly 520 is shown coupled to the arm 502 according to an example embodiment. As shown, the structure 508 is coupled to the fastener assembly 520. The fastener assembly 520 may be the same or similar to the fastener assembly 100 described above. The fastener assembly 520 includes a fastener 522. The fastener 522 is received by the aperture 510 in the structure 508. The fastener 522 may couple the arm 502 and the structure 508 to another structure (e.g., the first structure 106 or the blade spar 700 shown in FIG. 10). The fastener 522 may be the same or similar to the fastener 102 described above. The fastener 522 may be positioned within a first bushing 524. The first bushing 524 may be the same or similar to the first bushing 104 discussed above. For example, the first bushing 524 may have a taper angle (e.g., the taper angle 202) that results in a gap (e.g., the gap 200) between the fastener 522 and the first bushing 524.

Figure 10:
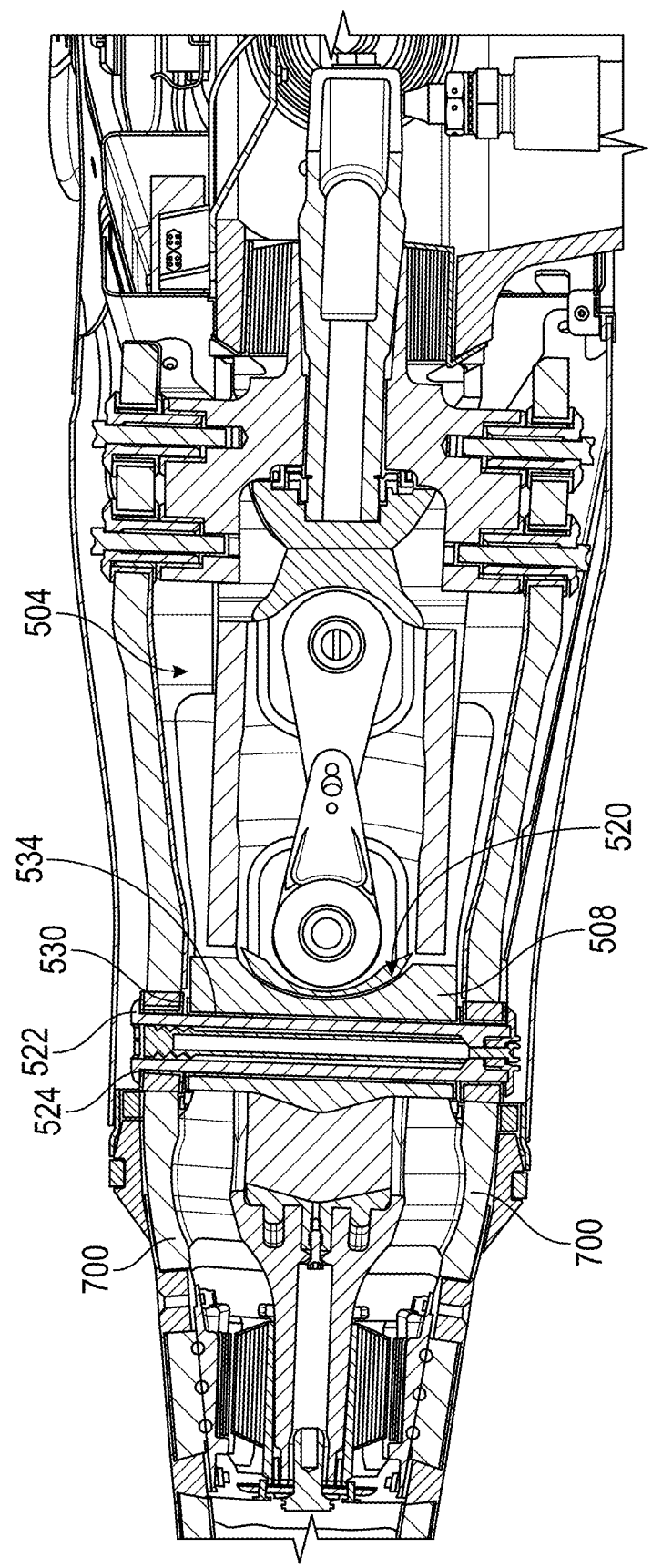
FIG. 10 is a cross sectional view of an arm coupled to a blade spar, according to an example embodiment.

Referring now to FIG. 10, a cross sectional view of an arm 504 coupled to a blade spar 700 is shown, according to an example embodiment. The blade spar 700 may be a part of a helicopter blade assembly. According to various embodiments, the blade spar 700 is manufactured from a composite material (e.g., carbon fiber, poly-paraphenylene terephthalamide (K29) (e.g. Kevlar® made by DuPont de Nemours, Inc. of Wilmington, DE), fiberglass, etc.). As shown, the blade spar 700 is coupled to the structure 508 via the fastener assembly 520. As shown, the fastener assembly includes the first bushing 524. As discussed above, the first bushing 524 may include a taper angle, which may reduce local stress concentrations in the blade spar 700 similar as is described above with respect to FIGS. 1-7. The fastener assembly 520 further includes a second bushing 530 and a third bushing 534, which may be the same or similar to the second bushing 110 and the third bushing 114 described above.

Various numerical values herein are provided for reference purposes only. Unless otherwise indicated, all numbers expressing quantities of properties, parameters, conditions, and so forth, used in the specification and claims are to be understood as being modified in all instances by the term "about" or "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "about" or "approximately" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein. Other modifications are contemplated without departing from the scope and spirit of the present disclosure.

What is claimed is:

1. A method of coupling a first structure to a second structure, comprising:
    providing a first bushing within an opening in an upper surface of the first structure without the first bushing extending into a second opening in the second structure, an inner opening of the first bushing defining an inner diameter; and
    providing a fastener at least partially within the first bushing and at least partially within the second opening, an outer surface of the fastener defining an outer diameter, the first bushing and the fastener being configured such that a space between the outer surface of the fastener and the inner opening of the first bushing defines a gap dimensioned to increase in a direction away from the upper surface of the first structure.

2. The method of claim 1, wherein the inner diameter of the first bushing increases in the direction away from the upper surface of the first structure.

3. The method of claim 1, wherein the outer diameter of the fastener decreases in the direction away from the upper surface.

4. The method of claim 1, wherein the outer surface of the fastener and the inner opening of the first bushing define a taper angle, wherein the taper angle is approximately 0.8 degrees.

5. The method of claim 1, wherein the method further comprises:
    providing a second bushing within the opening of the first structure; and
    surrounding a portion of the first bushing and the second bushing with a retainer.

6. The method of claim 1, wherein the first structure comprises composite material.

7. The method of claim 1, wherein the fastener comprises metal.

8. The method of claim 1, further comprising providing at least an additional bushing comprising a flange within the second opening with a lower surface of the flange flush with an upper surface of the second structure, the additional bushing defining a second inner opening, wherein providing the fastener at least partially within the second opening comprises positioning the fastener at least partially within the second inner opening.

9. The method of claim 1, wherein the first structure is a rotor blade, and the second structure is a rotor head.

10. The method of claim 1, wherein the outer surface of the fastener and the inner opening of the first bushing define a taper angle, wherein the taper angle is between about 0.1 degrees and about 1.0 degrees.

11. The method of claim 1, further comprising:
    providing a second bushing comprising a first flange within the opening in the upper surface of the first structure, wherein providing the first bushing within the opening in the upper surface of the first structure comprises providing the first bushing within an inner opening of the second bushing; and
    providing a third bushing comprising a second flange within the second opening, with the second flange of the third bushing in contact with the first flange of the second bushing, the third bushing defining a second inner opening, wherein providing the fastener at least partially within the second opening comprises positioning the fastener at least partially within the second inner opening.

12. The method of claim 1, further comprising providing at least an additional bushing within an additional opening in the first structure, wherein providing the fastener partially within the first bushing further comprises providing the fastener at least partially within an inner opening of the additional bushing.

13. The method of claim 12, wherein when the fastener is provided at least partially within the inner opening of the additional bushing, the additional bushing and the fastener are configured such that a space between the outer surface of the fastener and the inner opening of the additional bushing defines a gap decreasing in size in the direction away from the upper surface of the first structure.

\* \* \* \* \*